April 3, 1962     H. J. ARMITAGE     3,027,693
WORK HOLDER
Original Filed Feb. 21, 1957
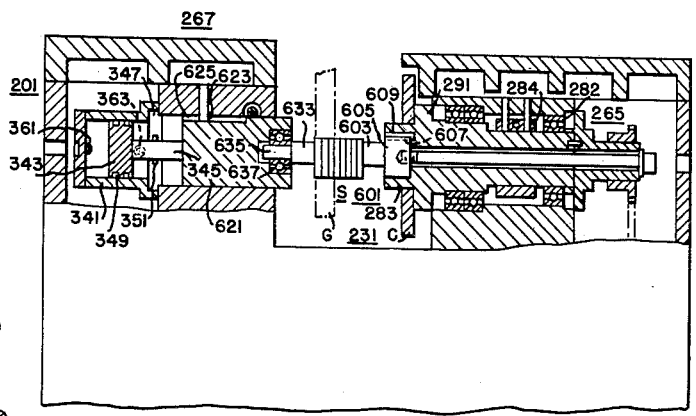
Fig.1
Fig.2
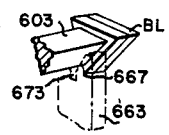

United States Patent Office 3,027,693
Patented Apr. 3, 1962

3,027,693
WORK HOLDER
Harry J. Armitage, Murrysville, Pa., assignor to Kennametal Inc., a corporation of Pennsylvania
Original application Feb. 21, 1957, Ser. No. 641,721, now Patent No. 2,932,133, dated Apr. 12, 1960. Divided and this application Jan. 4, 1960, Ser. No. 150
4 Claims. (Cl. 51—277)

This application is a division of Patent 2,932,133 granted April 12, 1960.

This application relates to the art of forming work into desired configurations and has particular relationship to the forming of tools or bits of very hard material such as tungsten carbide. Patent 2,786,312 granted March 26, 1957 to the applicant of this application is incorporated in this application by reference. As in Patent 2,786,312 reference to tungsten carbide is to be taken to include within its scope not only tungsten carbide but also other like hard materials, which are the patentable equivalents of tungsten carbide. In addition, this invention in certain of its specific aspects may be applied to softer materials, such as steel, brass, bronze particularly where such materials are to be formed into odd shapes.

Patent 2,786,312 discloses apparatus for forming tungsten-carbide tools or bits to close tolerances of the order of .001 inch or even better by rotary grinding. The inventive concepts disclosed in Patent 2,786,312 apply generally to tools of all geometric forms, but prior to the invention disclosed in this application the teaching of Patent 2,786,312 had been applied to the making of tools in the form of elongated, prismatic rods, the tolerances of the cross sections of which are maintained as described above. In addition to the rod-shaped tools or bits so-called throw-away inserts of tungsten carbide are used in industry for cutting or shaping purposes. Such inserts are of prismatic form like the rods but they are relatively thin; the height (that is the distance between the polygonal bases) of an insert may be one-tenth or one-twentieth the height of a rod. In this application the work "insert" will be used to designate the thin bit or tool and the work "rod" to designate the rod-shaped bit or tool. Such inserts could be formed one at a time, as taught by Patent 2,786,312 but the inserts would then have an excessively high unit cost.

It is then broadly an object of this invention to provide apparatus for forming tungsten-carbide inserts at a relatively low cost and specifically a tool for use in such apparatus.

The molded work-piece from which the insert is formed will be designated here as a blank or work-piece blank and the finished insert will be designated herein as insert or finished insert. The prismatic blank has a height which is equal approximately to the height of finished insert and the bases and transverse cross section of the blank have dimensions of greater area than the bases and transverse cross section of finished insert. The inserts are formed by removal by edge grinding of the stock which embodies the excess in area of the work-piece blank cross section over that of the insert cross section.

In accordance with this invention the blanks are ganged for grinding or forming, that is instead of being ground one at a time, ten or twenty blanks are ground together in one operation in a stack. For this purpose the stack is to be inserted between the spindles of a transversely movable cradle as disclosed in Patent 2,786,312. But stack grinding of the blanks presents serious problems, at least two of which require particular consideration. Since the dimensions of the finished inserts must be maintained to close tolerances, each stack of blanks must be precisely centered for grinding and it is a specific object of this invention to provide apparatus and a method for centering for grinding a stack of blanks which are to be formed into inserts to close tolerances between the spindles of a cradle as disclosed in Patent 2,786,312. In addition, the force which is exerted on the stack transversely by the grinding wheel or surface is very large. The grinding surface would then tend to cause individual blanks in a stack to move relative to each other. Since even slight movement of any blank relative to the axis of a stack would prevent the attainment of the necessary precision, it is essential that transverse movement be entirely suppressed. It is a specific object of this invention to provide a locator for setting the stack for grinding in such a way that transverse movement of individual blanks shall not occur.

In accordance with this invention, a locator for centering the blanks is provided. This locator includes a block having a V-groove within which a stack of blanks may be nested. The locator also includes end pieces, each of which also has a V-groove. The end pieces are adjustable along the ends of the block so that the V-grooves of the end pieces overlap the ends of the block. The end pieces may be positioned so that the distance of the overlap corresponds or is equal to the stock of the blanks in a stack which is to be ground away. In the practice of this invention a stack of blanks is nested in the V-groove of the block of a locator between the end pieces and the end pieces are set to correspond to the stock to be removed. The locator is also provided with a releasable bracket for holding the stack firmly in the block.

The grinding or forming apparatus in accordance with this invention includes a transversely movable cradle having spindles, the engaging ends of which are shaped to cooperate with the locator. One of these spindles is driven and the other is preferably undriven but rotatable. The driven spindle preferably has an engaging tip having a cross section congruent to the finished insert; the other spindle may have a circularly cylindrical tip. The latter spindle is also mounted so that pressure may be applied through it.

In the practice of this invention the locator with the stack of blanks held in it is placed between the spindles so that the stack extends along the axis of the spindles. The spindles are then engaged with the end blanks of the stack with the edges of the driving spindle nested in the V-groove of the end piece on one side of the stack and the edges of the idling spindle tangent to the V-groove of the end piece on the other side of the stack. Pressure is then applied to the stack through the idling spindle so that the stack is held and the holding bracket is removed. The stack is now centered.

The aspect of this invention involving the prevention of lateral movement of the blanks under the force exerted by the grinding surface arises from the realization that under longitudinal pressure the molecules of adjacent clean flat surfaces exert high attractive forces on each other. Under the proper circumstances the forces may be so high as to cause the facing surfaces to be joined as in cold welding for example. In accordance with this invention the base faces of the blanks are ground flat and substantial longitudinal pressure is exerted on the stack through the idling spindle. It has been found that under such circumstances the tangential forces exerted between the surfaces of the blanks are adequate to resist the force exerted by the grinding surface. Once located for grinding with the aid of the locator the blanks resist lateral movement and may be ground into finished inserts with the high tolerance demanded.

The pressure impressed on the idling spindle should be of the order of several hundred pounds per square inch. In one situation in which inserts having a cross-sectional area varying from less than one-half square inch to more than one inch a longitudinal force of seven hundred fifty pounds is applied hydraulically through a piston having an area of three square inches. In working with this apparatus it has been found that the effectiveness of the longitudinal pressure in preventing transverse movement of the blanks is materially improved with the engaging faces of the spindles hollowed out so that the areas over which they engage the end blanks of a stack are as small as practicable. This results in a very large pressure between the spindles and the end blanks of a stack.

The novel features considered characteristic of this invention are disclosed generally above. The invention itself both as to its organization and as to its method of operation together with additional objects and advantages thereof will be understood from the following description of a specific embodiment when read in connection with the accompanying drawing, in which:

FIGURE 1 is a diagrammatic view showing a triangular insert made in the practice of this invention;

FIGURE 2 is a diagrammatic view showing a square insert made in the practice of this invention;

FIG. 3 is a view partly in side elevation and partly in section with parts broken away of a forming machine as disclosed in application 509,489 adapted to this invention;

FIG. 4 is a view in top elevation of a locator in accordance with this invention;

FIG. 5 is a view in side elevation from one side of the locator shown in FIG. 4;

FIG. 6 is a view in side elevation from the opposite side of the locator shown in FIG. 4;

FIG. 7 is a view in end elevation of the locator shown in FIG. 4;

FIG. 8 is a fragmental view showing a driving spindle as used in the practice of this invention;

FIG. 9 is a fragmental view showing an idling spindle as used in the practice of this invention;

FIG. 10 is a fragmental view showing a stack of blanks mounted for grinding in accordance with this invention; and FIG. 11 is a diagrammatic view showing the preferred relationship between a cam and a cam-follower roller in the practice of this invention.

FIGS. 1 and 2 show a base or a cross section of a finished insert made in accordance with this invention. FIG. 1 shows an insert, the cross section of which is a regular triangle and FIG. 2 an insert having a square cross section. It is desirable that the insert be precisely formed. For an insert of any general cross section, this precision is defined by the proposition that the distances from the apices to the axis (or center of the cross section) that is, the distances $a,b,c$ for FIG. 1, and $d,e,f,g$, for FIG. 2, should be equal within .001 inch or better; in certain situations it is desirable that these distances be maintained within .00025 inch. For a triangular insert the precision may be defined by the proposition that the distances from each apex to the opposite sides should be equal to within .001 inch or .00025 inch as the case may be. The apieces of the cross sections of the inserts shown in FIGS. 1 and 2 are rounded. It is essential that the radii of the apices be precisely dimensioned and the centers of the apices be precisely positioned to achieve the desired precision. The importance of this feature is that once an insert is set for a cutting or grinding operation, all of its apices are in the same cutting position within .001 or .00025 inch. This invention has its principal utility in the forming of the precise inserts just described but it may also be applied to the forming of less precise inserts or work of other odd shapes.

FIGS. 3, 8, 9 and 10 show the principal features concerned with this invention of apparatus such as is disclosed in Patent 2,786,312. While this apparatus differs in certain important respects from the apparatus shown in Patent 2,786,312, it is sufficiently similar so that to the extent that any additional information may be desired for an understanding of this apparatus the reader is referred to Patent 2,786,312. To facilitate this understanding the identification numbers in FIGS. 3, 8, 9 and 10 to a large extent correspond to the identification numbers of Patent 2,786,312.

The apparatus disclosed herein includes a container or casing 201 within which a cradle 231 is pivotally mounted. The cradle 231 has a head stock 265 and a tail stock 267. The head stock includes a hollow flanged shaft 281 rotatable on anti-friction bearings 282 and driven as disclosed in Patent 2,786,312. The shaft 281 is provided with a brake 284 (as disclosed in Patent 2,786,312).

A cup-shaped stem 283 extends from a shoulder 291 on the shaft 281. A cam C contoured to produce the finished inserts is centrally secured to the shoulder.

The cam C cooperates with a cam-follower assembly CF1 (as disclosed in Patent 2,786,312) which is mounted on the housing 201. The cam C is urged into engagement with the follower CF1 by a spring 399. By the cooperation of the cam C and cam follower CF1, the cradle 231 may thus be rocked back and forth in dependence upon the contour of the cam C and the position of the cradle relative to a grinding wheel or surface G may be varied. As disclosed in Patent 2,786,312, the cam follower CF1 has a cam-engaging roller 391 (FIG. 14). While the apparatus as disclosed in Patent 2,786,312, with the roller 391 has been found to operate highly satisfactorily, it has been found that for the highest precision, particularly in the forming of precise rounded apices on the inserts the cam-follower roller should be approximately of the same dimensions as the cam; that is, the follower roller should have a radius approximately equal to the maximum distance from the geometric center or axis of rotation of the cam to the periphery. Thus the distance $g$ and $g'$ in FIG. 11 should be approximately equal.

The head stock 265 includes a driving spindle 601 having a work-engaging stem 603 extending from a cylinder 605 having a keyway 607 therein. The stem 603 has a cross section congruent with the cross section of the finished insert. The engaging face of the stem 603 has an opening 604 to minimize the engaging area. In the situation illustrated it is assumed that a triangular insert is being formed and in this case the cross section of the stem 603 is triangular. The cylinder 605 is screwed onto bolt 293 and keyed in the shaft 281 by a key 609 which is locked in the keyway 607 and in a key slot in the stem 283. As the shaft 281 is driven, the cylinder 605 is rotated. The spindle 601 is locked by the key 609 and keyway 607 on the shaft 281 with the work-engaging stem 603 oriented in a predetermined manner relative to the cam C. The stem 603 having the same cross section as the insert may then set the stack S so that the blanks BL are properly oriented relative to the cam C.

The tail stock 267 includes a bushing sleeve 321. A cylindrical block 621 is slidable in the sleeve 321. The block 621 is guided by a key 623 which extends into a key slot 625. The tail stock 267 also includes a cylinder 341, secured to the bushing 321, within which a piston 343 is slidable. A stem 345 extends from the piston 343 and is secured to the block 621 so that the block is movable with the piston. The stem 343 is movable in a bearing disc 347 which is mounted on the sleeve 321. O rings 349 and 351 are provided as packing between the piston 343 and the walls of the cylinder 321 and between the stem 345 and the bearing 347. The cylinder 341 is provided with fluid inlet and outlet openings 361 and 363 respectively.

The tail stock 267 includes a spindle 631. The spindle 631 includes a work-engaging cylinder 633 from which a stem 635 extends. The work-engaging surface of the cylinder 633 has an opening 636 to minimize the area of work engagement. The stem 635 is secured to the rotatable race of an anti-friction bearing 634 centrally mounted in the inner surface of the block 621. The spindle 631 is thus rotatable in the bearing 635. In addition, the spindle 631 may be moved inwardly towards the spindle 601 by the piston 343. The spindles 601 and 631 are coaxial.

The work-piece blanks BL are usually molded in the general form of the finished inserts; in the case illustrated they are triangular. The dimensions of the blanks are such that in forming an insert a thin layer of stock is ground away from each side of the blank BL. Since the grinding tends to wear away the grinding wheel G, it is desirable that the blanks BL be dimensioned so that the stock to be ground away is a minimum. For forming the blanks BL are assembled into a stack S and centered between the spindles 601 and 631 by the locator shown in FIGS. 4 through 7 which is an important feature of this invention. The surfaces of the blanks BL are ground substantially flat and the blanks are cleaned preparatory to the assembly in the stack S.

The locator includes a block 651 having a V-groove 653 which has a slot 654 in its apex. The block 651 is provided with grooves 655 and 657 in its end faces 659 and 661 in which end pieces 663 and 665 are slidably mounted. Each of the end pieces 663 and 665 has a V-groove 667 and 671 which has a slot 673 and 675 in its apex. The end pieces 663 and 665 may be secured in any position in the grooves 655 and 657 respectively by bolts 677 and 679 which pass through slots 681 and 683 in the pieces and screw into the end faces 659 and 661 of the block 651. The V-grooves 667 and 671 may thus be set to overlap the V-groove 653 by any desired distance.

A supporting bracket 691 of C longitudinal section is secured by bolts 693 to one side of the block 651. A blank holding or locking bracket 695 of generally rectangular form is pivotally mounted on the bracket 691. The bracket 695 has an arm 697 which extends into the groove 699 of the bracket 691 and is pivotally suspended on a pin 701 extending through the bracket 691 longitudinally. The bracket 695 also has a holding plate 703 extending from the arm 697 at right angles. The plate 703 has a pad 705 of felt, rubber or like yieldable material as a work-engaging face.

The bracket 695 is resiliently urged towards the V-groove 253 by compression springs 711 which are disposed in openings in the face of the block 661 which carries the C-bracket 691 and act against the arm 697.

In the practice of this invention the end pieces 663 and 665 are set to overlap the V-groove 653 by a distance equal to the thickness of the stock in the blanks BL to be ground away. A stack S of blanks BL is then inserted between the end pieces 663 and 665, so that they nest in the V-groove 653 with their apices extending into the slot 654. The stack S is held firmly by the bracket 695. The felt or rubber adjusts itself to the irregularities in the ends of the blanks BL, thereby permitting the bracket 695 to hold the blanks firmly in the V-groove. The felt pad 705 thus permits the bracket 695 to be seated firmly on the upper edges of the blanks BL in the stack S. The locator with the stack S is then held in the cradle 231 between the spindles 601 and 631 with the stack longitudinal and the work-engaging parts 603 and 633 of the spindles are engaged with the respective end blanks of the stack. The driving spindle 601 is set with two sides of its work-engaging end 603 firmly nested in the V-groove 667 of the adjacent end piece 663 and the work-engaging end 633 of the other spindle is set tangent to the groove 871 of the end piece 665. Substantial pressure is now applied to the stack S by the fluid in cylinder 341 through the piston 343 and spindle 631. The bracket 695 is now retracted from the stack S and the locator is removed.

The stack S is now centered in the cradle 231 and may be ground or formed as disclosed in Patent 2,786,312 for single piece W. The work-engaging stem 603 is set with one of its apices coincident with an apex of the finished insert. Since the apex of the stem is oriented in a predetermined manner relative to the cam C because of the way in which the cylinder 605 is locked on the shaft 281, the work-piece blanks BL are properly oriented relative to the cam. The in-feed of the wheel G is determined by the axis of the driving spindle 601. The blanks BL are ground to finished inserts when the sides of the stack S are flush with the sides of the work-engaging end 603.

I claim:

1. A locator for a stack of work-piece blanks each blank of generally prismatic form comprising a block having a V-shaped groove adapted to support the stack with one of its apices nesting in said groove, an end plate for each end of said block, each end plate having a V-shaped groove corresponding to said V-shaped groove in said block, means mounting said end plates adjustable on the ends of said block so that said V-shaped grooves in each end plate may be set to overlap said groove in said block by a predetermined distance, and releasable means for holding said stack in said groove of said block between said end plates.

2. A locator for a stack of work-piece blanks each blank having a contour defining opposite substantially parallel base surfaces, different parts of said contour being spaced different distances from the center of said surfaces, said locator comprising a block having a seat, having a supporting surface substantially congruent with a substantial portion of said contour so that said seat is adapted to support said stack with said portion nesting in said seat, an end plate for each end of said block, each end plate having a seat generally geometrically similar to said portion of said contour, means mounting said end plates adjustable on said ends of said block and with the seats of said end plates generally parallel to the contour of the seat of said block so that said seats in each end plate may be set to overlap said groove in said block by a predetermined distance, and releasable means for holding said stack in said seat of said block between said end plates.

3. A locator for a stack of work-piece blanks each blank having a contour defining opposite substantially parallel base surfaces, different parts of said contour being spaced different distances from the center of said surfaces, said locator comprising a block having a seat having a supporting surface substantially congruent with a substantial portion of said contour so that said seat is adapted to support said stack with said portion nesting in said seat, an end plate for each end of said block, each end plate having a seat generally geometrically similar to said portion of said contour, and means mounting said end plates adjustable on said ends of said block and with the seats of said end plates generally parallel to the contour of the seat of said block so that said seats in each end plate may be set to overlap said groove in said block by a predetermined distance.

4. A locator for a stack of work-piece blanks for locating said stack in engagement with the engaging mechanism of a grinding machine, said locator comprising a block having a supporting surface to support said stack with the blanks of said stack engaging at least certain points of said surface, an end plate for at least one end of said block, said end plate having a predetermined contour for exposing the surface of the adjacent end blank of said stack, adjustable means for mounting said end plate on said end of said block overlapping a predetermined portion of said surface of said end blank so as to expose a predetermined portion of said surfact of said end blank for engagement by said engaging mechanism, and means connected to said block for holding said stack in said block in such manner that said stack is readily disengageable from said block on engagement of said stack with said engaging mechanism.

References Cited in the file of this patent

UNITED STATES PATENTS

| | | |
|---|---|---|
| 1,654,174 | Kistner | Dec. 27, 1927 |
| 2,394,645 | Turner | Feb. 12, 1946 |
| 2,422,773 | Colwill | June 24, 1947 |
| 2,817,929 | Engel | Dec. 31, 1957 |